US009356757B2

(12) United States Patent
Stauffer et al.

(10) Patent No.: US 9,356,757 B2
(45) Date of Patent: May 31, 2016

(54) WIRELESS COMMUNICATION DEVICE CAPABLE OF SCANNING FOR AVAILABLE BASE STATIONS USING REDUCED BANDWIDTH

(71) Applicants: Erik Stauffer, Mountain View, CA (US); Robert Gustav Lorenz, Menlo Park, CA (US); Kamlesh Rath, San Ramon, CA (US)

(72) Inventors: Erik Stauffer, Mountain View, CA (US); Robert Gustav Lorenz, Menlo Park, CA (US); Kamlesh Rath, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 30 days.

(21) Appl. No.: 13/631,362

(22) Filed: Sep. 28, 2012

(65) Prior Publication Data
US 2013/0170418 A1 Jul. 4, 2013

Related U.S. Application Data

(60) Provisional application No. 61/581,978, filed on Dec. 30, 2011.

(51) Int. Cl.
*H04L 5/00* (2006.01)
*H04W 48/16* (2009.01)
(Continued)

(52) U.S. Cl.
CPC ............ *H04L 5/0053* (2013.01); *H04L 27/38* (2013.01); *H04W 48/16* (2013.01); *H04W 52/0229* (2013.01); *H04W 52/0232* (2013.01)

(58) Field of Classification Search
USPC ......... 370/252, 329, 241, 254, 347, 311, 330, 370/332, 345; 455/434, 67.11, 226.1, 41.2, 455/423, 150.1, 161.1, 450, 452.2, 500, 73; 375/219
See application file for complete search history.

(56) References Cited

U.S. PATENT DOCUMENTS 5,822,686 A * 10/1998 Lundberg et al. .......... 455/161.3
6,292,660 B1 * 9/2001 Hartless ................ H04W 48/16
340/7.42
(Continued)

FOREIGN PATENT DOCUMENTS

CN         1968025 A   *  5/2007
WO   WO 0019751 A1  *  4/2000  ............ H04W 48/16
WO   WO 0215615 A1  *  2/2002  ............ H04W 48/16

OTHER PUBLICATIONS

3GPP TS 25.215, Technical Specification Group Radio Access Network; Physical layer; Measurements (FDD) (Release 9) , Mar. 2010, V9.2.0, pp. 19-20.*

(Continued)

*Primary Examiner* — Benjamin H Elliott, IV
*Assistant Examiner* — Eric Nowlin
(74) *Attorney, Agent, or Firm* — Sterne, Kessler, Goldstein & Fox PLLC

(57) ABSTRACT

A wireless communication device is disclosed that includes multiple antennas capable of being used for carrier aggregation, and that uses its additional antennas to scan for available base stations without interfering with connectivity to a current base station and/or while maximizing useable bandwidth. The wireless communication device may scan using multiple of the antennas to maximize scanning results and reduce scan time, and may scan for available base stations using some of its antennas while maintaining its connection to the current base station with its other antennas. The device can also analyze control channel portions of received signals to utilize periods of signal inactivity to scan for available base stations, such as DRX or SPS modes of operation. In addition, the device can measure various parameters to optimize its scanning capabilities.

17 Claims, 8 Drawing Sheets

(51) Int. Cl.
*H04W 52/02* (2009.01)
*H04L 27/38* (2006.01)

(56) References Cited

U.S. PATENT DOCUMENTS

| | | | | |
|---|---|---|---|---|
| 6,360,097 | B1* | 3/2002 | Smith | H04W 48/16 |
| | | | | 340/7.42 |
| 6,385,460 | B1* | 5/2002 | Wan | 455/515 |
| 6,526,279 | B1* | 2/2003 | Dent | 455/437 |
| 7,602,742 | B1* | 10/2009 | Skinner et al. | 370/311 |
| 7,602,757 | B2* | 10/2009 | Jeong et al. | 370/338 |
| 7,689,217 | B2* | 3/2010 | Ruelke et al. | 455/434 |
| 8,238,268 | B1* | 8/2012 | Shmidt | 370/254 |
| 8,538,469 | B2* | 9/2013 | Wilhelmsson et al. | 455/501 |
| 8,553,617 | B1* | 10/2013 | Shmidt | 370/328 |
| 2002/0006119 | A1* | 1/2002 | Steudle | 370/329 |
| 2003/0117980 | A1* | 6/2003 | Kim et al. | 370/332 |
| 2004/0137905 | A1* | 7/2004 | Jeong et al. | 455/450 |
| 2008/0026718 | A1* | 1/2008 | Wangard et al. | 455/266 |
| 2008/0144580 | A1* | 6/2008 | Su | H04W 48/16 |
| | | | | 370/332 |
| 2008/0165759 | A1* | 7/2008 | Khoo et al. | 370/347 |
| 2009/0022062 | A1* | 1/2009 | Wang et al. | 370/252 |
| 2009/0137247 | A1* | 5/2009 | Mok | 455/434 |
| 2009/0227209 | A1* | 9/2009 | Craig et al. | 455/67.13 |
| 2009/0296652 | A1* | 12/2009 | Rudowicz et al. | 370/331 |
| 2009/0325501 | A1* | 12/2009 | Somasundaram et al. | 455/67.11 |
| 2010/0034158 | A1* | 2/2010 | Meylan | 370/329 |
| 2010/0062765 | A1* | 3/2010 | Jung et al. | 455/434 |
| 2010/0184395 | A1* | 7/2010 | Bagge et al. | 455/161.1 |
| 2010/0197301 | A1* | 8/2010 | Islam et al. | 455/434 |
| 2010/0208598 | A1* | 8/2010 | Tsai et al. | 370/252 |
| 2010/0267394 | A1* | 10/2010 | Wu | 455/450 |
| 2010/0271953 | A1* | 10/2010 | Kim et al. | 370/241 |
| 2010/0284360 | A1* | 11/2010 | Dalsgaard et al. | 370/329 |
| 2010/0290420 | A1* | 11/2010 | Dalsgaard et al. | 370/329 |
| 2010/0291876 | A1* | 11/2010 | Hariharan et al. | 455/63.1 |
| 2011/0103318 | A1* | 5/2011 | Ekici et al. | 370/329 |
| 2011/0292847 | A1* | 12/2011 | Yoon et al. | 370/280 |
| 2013/0109372 | A1* | 5/2013 | Ekici | 455/422.1 |
| 2014/0198744 | A1* | 7/2014 | Wang et al. | 370/329 |
| 2014/0376652 | A1* | 12/2014 | Sayana et al. | 375/267 |

OTHER PUBLICATIONS

3GPP TS 36.321, Technical Specification Group Radio Access Network; Evolved Universal Terrestrial Radio Access (E-UTRA); Medium Access Control (MAC) protocol specification (Release 10), pp. 18-19, 30-31.*

* cited by examiner

WIRELESS COMMUNICATION DEVICE CAPABLE OF SCANNING FOR AVAILABLE BASE STATIONS USING REDUCED BANDWIDTH

CROSS REFERENCE TO RELATED APPLICATIONS

This application claims the benefit of U.S. Provisional Patent Application No. 61/581,978, filed on Dec. 30, 2011, which is incorporated by reference herein in its entirety.

BACKGROUND

1. Technical Field

The disclosure relates to wireless communications, and more specifically to a wireless communication device that is capable of searching for, and evaluating, available base stations using reduced amounts of usable bandwidth and/or other resources.

2. Related Art

Wireless communication devices, such as cellular telephones to provide an example, are becoming commonplace in both personal and commercial settings. The wireless communication devices provide users with access to all kinds of information. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points (e.g., base stations) to send and receive data. Typically, a first wireless communication device generates and transmits a radio frequency modulated with encoded information. This radio frequency is transmitted into a wireless environment and is received by a second wireless communication device. The second wireless communication device demodulates and decodes the received signal to obtain the information. The second wireless communication device may then respond in a similar manner. The wireless communication devices can communicate with each other or with base stations using any well-known modulation scheme, including amplitude modulation (AM), frequency modulation (FM), quadrature amplitude modulation (QAM), phase shift keying (PSK), quadrature phase shift keying (QPSK), and/or orthogonal frequency-division multiplexing, as well as any other communication scheme that is now, or will be, known.

The ability of the wireless communication device to successfully transmit/receive data is typically limited by the range of coverage of the base stations. For example, a wireless network, such as a cellular network, contains a plurality of base stations that each defines a coverage cell. Each cell defines the coverage zone for a corresponding base station, and is based on a modulation scheme used in the wireless network and the modulation scheme's corresponding standard/minimum coding rate. Wireless communication devices within the cell communicate with the base station to send and receive data.

Even when in communication with a current base station, the wireless communication device may also be within a coverage zone of one or more other base stations. In this case, it is often beneficial for the wireless communication device to search for those other base stations, and evaluate characteristics relating to those base stations. In particular, by searching for and measuring other base stations, the wireless communication device may determine a base station that can provide a stronger communication link, or that does not include as much traffic as the current base station.

However, in order to search for and evaluate available base stations, current wireless communication devices must request durations of communication breaks from the current base station in which the wireless communication device will briefly sever communications from the current base station. This method consumes bandwidth that could otherwise have been used for data transfer and/or other operations.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

Figure 3A:
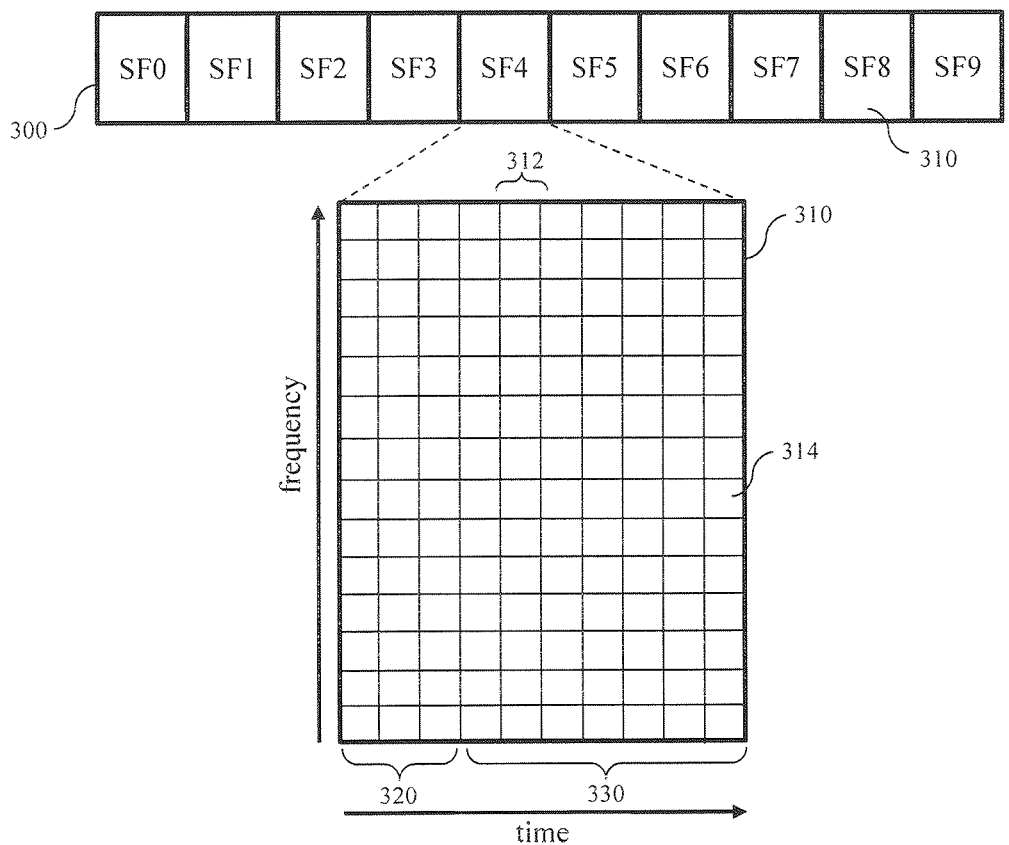
Figure 3B:
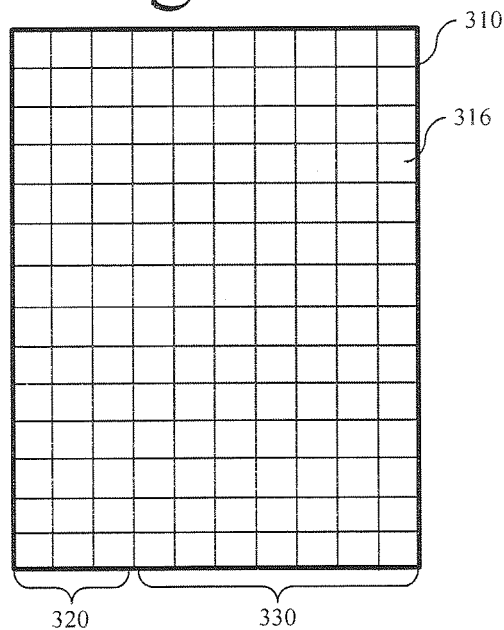
Figure 4:
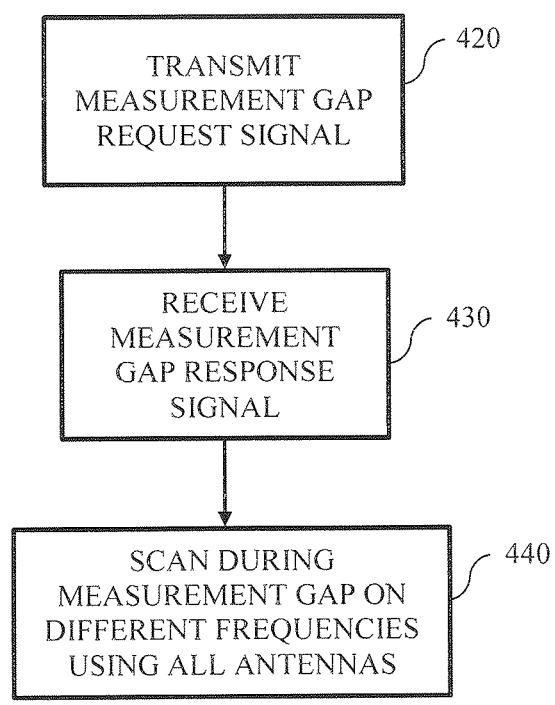
Figure 5:
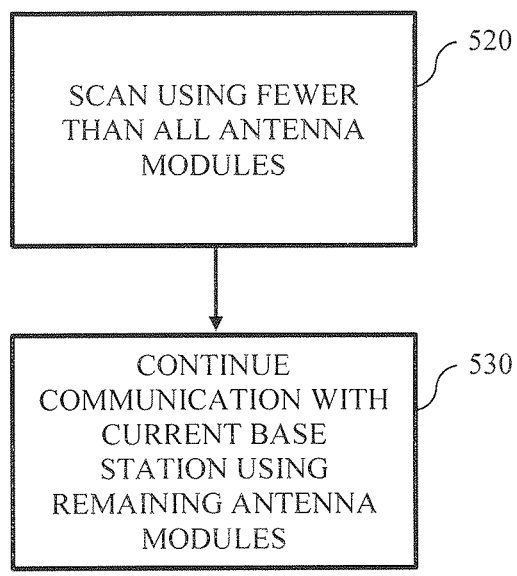
Figure 6:
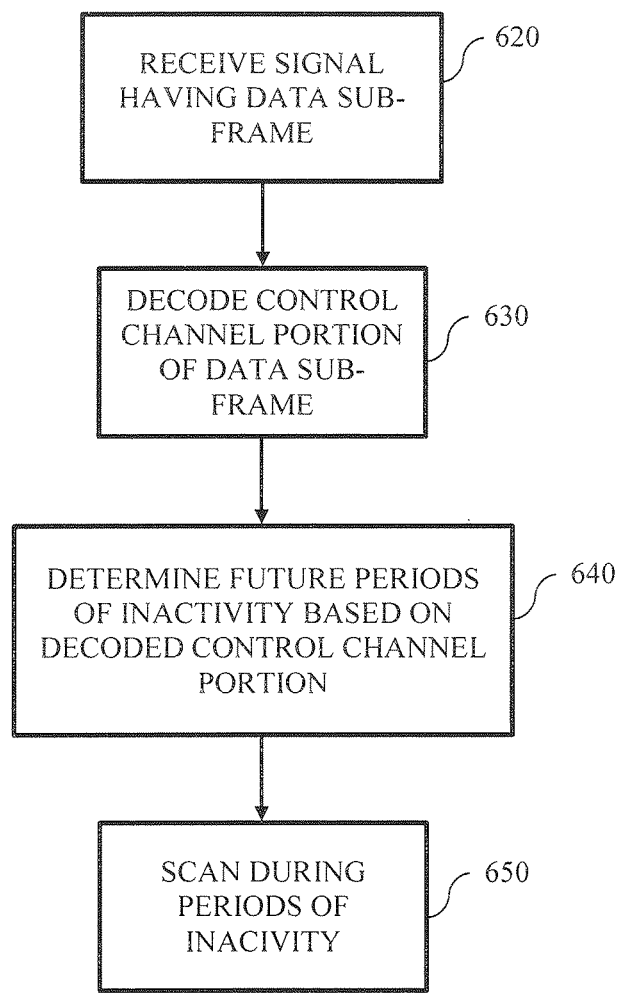
Figure 7:
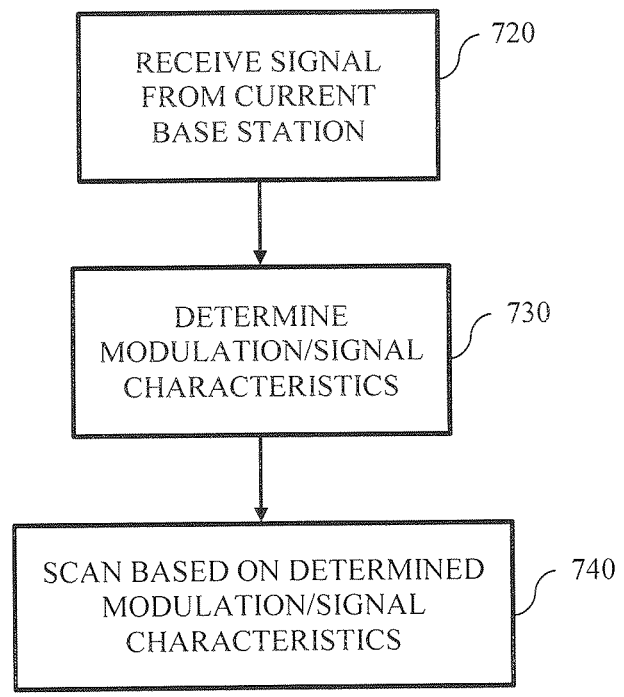

FIG. 3A graphically illustrates an exemplary communication frame and sub-frame of a received signal in accordance with a modulation scheme that may be implemented by the wireless communication device;

FIG. 3B graphically illustrates an exemplary communication sub-frame of the received signal in accordance with a modulation scheme that may be implemented by the wireless communication device;

FIG. 4 illustrates a block diagram of an exemplary method for scanning for available base stations;

FIG. 5 illustrates a block diagram of an exemplary method for scanning for available base stations;

FIG. 6 illustrates a block diagram of an exemplary method for scanning for available base stations; and FIG. 7 illustrates a block diagram of an exemplary method for scanning for available base stations.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present disclosure is to be described in terms of wireless communication (specifically cellular communication), those skilled in the relevant art(s) will recognize that the present disclosure may be applicable to other communications that use wired or other wireless communication methods without departing from the spirit and scope of the present disclosure.

An Exemplary Wireless Communications Environment

Figure 1:
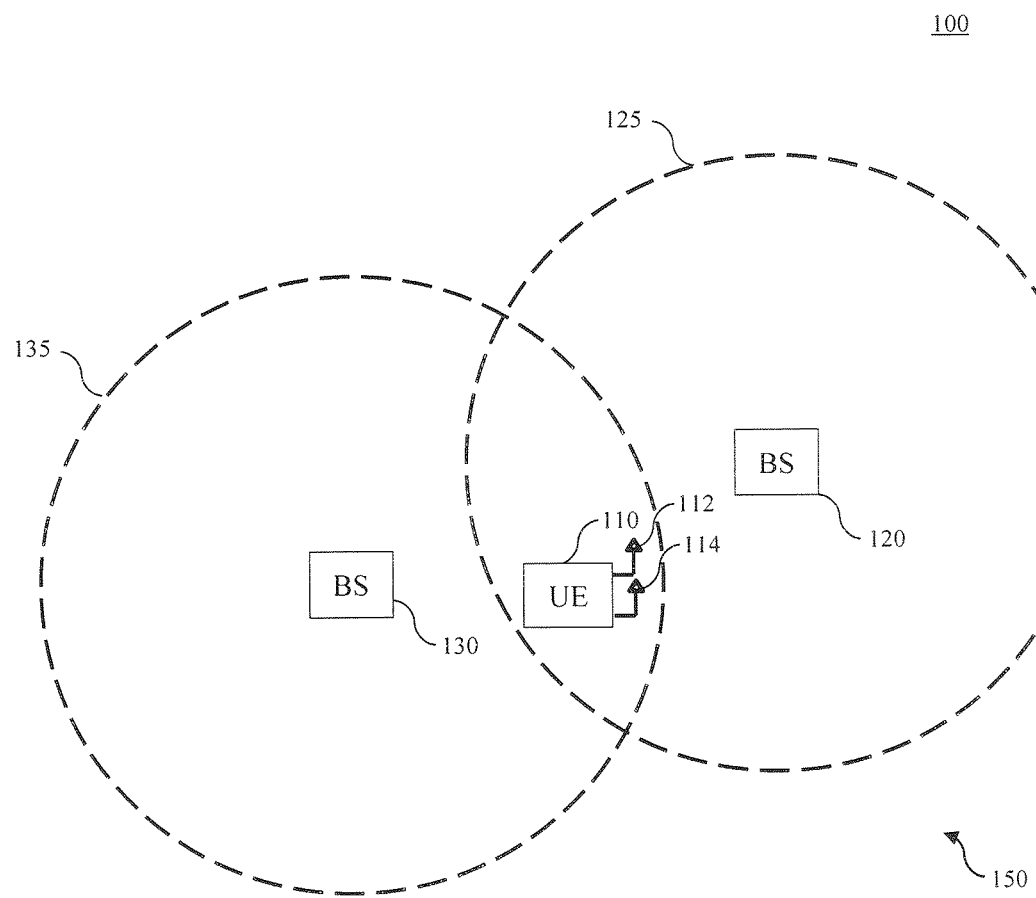
FIG. 1 illustrates a block diagram of an exemplary wireless communication environment.

FIG. 1 illustrates a block diagram of an exemplary wireless communication environment 100. The wireless communication environment 100 provides wireless communication of information, such as one or more commands and/or data, among user equipment UE 110 and wireless access points (base stations BS) that are within effective communication range of the user equipment 110. The user equipment 110 can be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player, or any combination thereof, to provide some examples and/or any other suitable electronic device that will be apparent to those skilled in the relevant art(s) without departing from the spirit and scope of the disclosure.

The exemplary wireless communication environment 100 includes a plurality of base stations for providing wireless connectivity to the user equipment 110. For example, base station 120 defines a wireless coverage cell 125 for providing wireless connectivity to mobile subscribers contained therein. Similarly, base station 130 defines a wireless coverage cell 135 for providing wireless connectivity to mobile subscribers contained therein. The combined cells of the wireless communication environment 100 define a wireless network 150. Wireless communication devices located within the wireless network 150 will be able to connect to the wireless network 150 and transfer information.

As shown in FIG. 1, the user equipment 110 is located within the wireless network 150, and therefore should be capable of connecting to the wireless network 150 in order to transmit and receive data. Further, the user equipment 110 is located within the wireless coverage cell 125 of the base station 120 and the wireless coverage cell 135 of the base station 130. Consequently, the user equipment 110 may be connected to at least one of the base station 120 and the base station 130.

The received signal strength of the wireless signals transmitted from one of the base stations can diminish as the distance between the user equipment 110 and that base station increases. The reduced signal strength is attributable to one or more of reduced power of the received signal, increased noise, and interference. Thus, a coverage cell associated with the base station defines a maximum distance that will allow for communications between the user equipment 110 and the base station using the designated modulation and coding scheme. Consequently, as the user equipment 110 moves towards the edge of the coverage cell of the base station, the strength of the signals received from the second wireless communication device 210 may diminish to the point that it may be desirable to "hand-off" to another base station with stronger signals.

Those skilled in the relevant art(s) will recognize that many factors affect the decision to hand-off to another base station, such as RSSI (Received Signal Strength Indication), CINR (Carrier to Interference plus Noise Ratio), power, delay, Doppler spread, and delay spread, among others. Further, hand-off decisions may be made based on any one of these factors, or based on any combination thereof.

Even while within the wireless network 150 and connected to a base station, the user equipment 110 can search for, and evaluate, other available base stations. For example, the user equipment 110 may be currently connected to base station 120. However, the user equipment is also within the wireless coverage cell 135 of the base station 130. Thus, the user equipment 110 can detect the base station 130, and once detected, can test signal characteristics of the base station 130. This process of searching for, and measuring characteristics of, available base stations can include searching one or more frequencies and one or more technologies (e.g., 2G, 3G and 4G, etc.), and will commonly be referred to throughout this specification as a "scanning operation," or merely a "scan," unless otherwise indicated.

In FIG. 1, the user equipment 110 is near the edge of the wireless coverage cell 125 of the base station 120. Thus, the signal strength between the user equipment 110 and the base station 120 may be extremely low. On the other hand, the user equipment is nearer to the center of the wireless coverage cell 135 of the base station 130. Therefore, even though the user equipment 110 is currently connected to the base station 120, it may nonetheless be beneficial to switch to the base station 130, depending on the results of an evaluation of the base station 130.

The user equipment 110 may include a plurality of transceiver modules that each includes one or more communication chains. Each of the transceiver modules may be communicate via a corresponding antenna 112/114. The number of antennas may correspond to the number of transceiver modules included in the user equipment 110, and is not limited to two. In an embodiment, the communication chains of different transceiver modules may share antennas 112/114, as will be discussed in further detail below. With this configuration, the user equipment can perform advanced scanning operations that more efficiently uses available bandwidth, as will be discussed in further detail below.

An Exemplary Wireless Communication Device

Figure 2A:
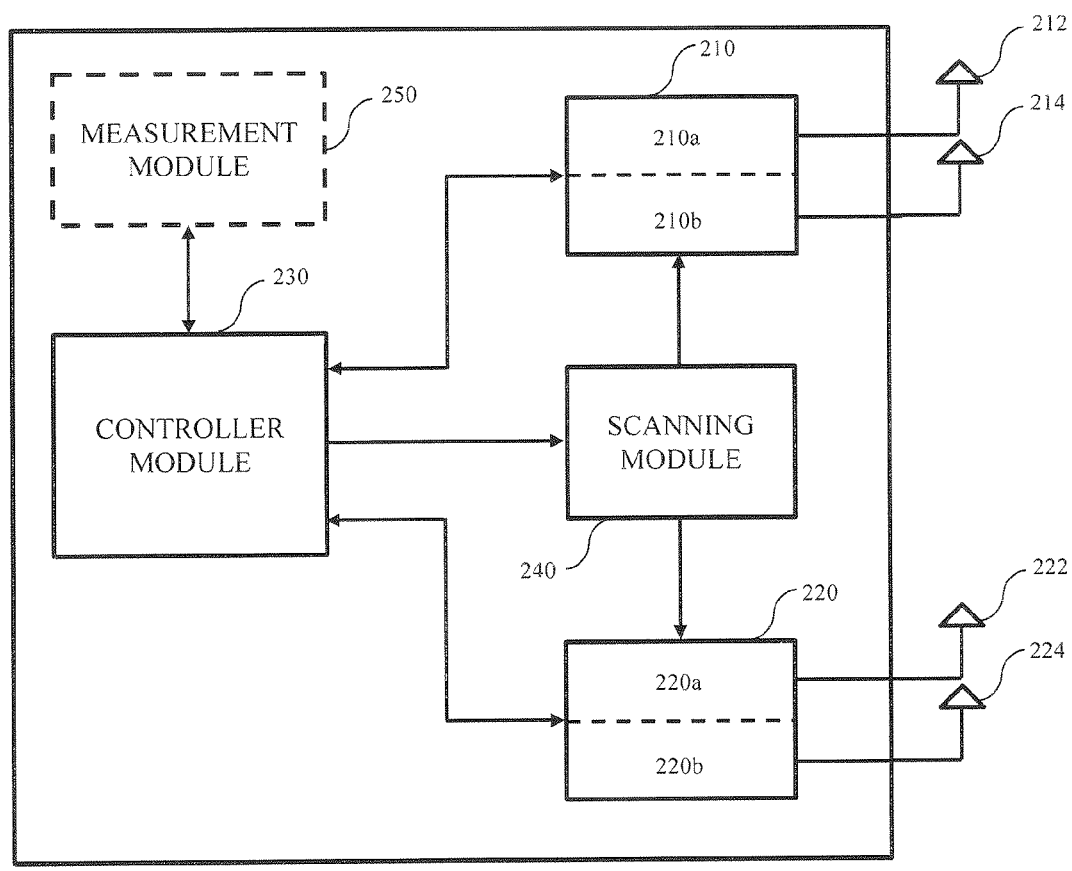
FIG. 2A illustrates a block diagram of an exemplary wireless communication device that may be implemented within the wireless communication environment.

FIG. 2A illustrates a block diagram of an exemplary wireless communication device 200 that may be implemented within the wireless communication environment 100. The wireless communication device 200 includes transceiver modules 210 and 220 and a scanning module 240, and may represent an exemplary embodiment of the user equipment 110. For simplification, several aspects unrelated to scanning for available base stations are omitted from the description of the wireless communication device 200.

The first wireless communication device 200 includes a controller module 230 that performs many of the operations of the first wireless communication device 200. The controller module 230 can also generate a data signal based on user operations of the wireless communication device 200.

The 4G LTE specification, the entirety of which is incorporated herein by reference, requires wireless devices to employ a 2×2 MIMO (Multiple-Input and Multiple Output). Therefore, the wireless communication device 200 includes a transceiver module 210 that includes a first communication chain 210a that is connected to an antenna 212, and includes a second communication chain 210b that is connected to an antenna 214. Each communication chain can be configured to be capable of only receiving data, only transmitting data, or both transmitting and receiving data. Further, only one communication chain is required to have transmitting capabilities.

Although the transceiver module 210 is alone sufficient to satisfy the LTE 2×2 MIMO requirement, the functionality of the wireless communication device 200 can be substantially enhanced by incorporating additional transceiver modules for carrier aggregation. Carrier aggregation allows for communication over multiple contiguous or non-contiguous frequency bands, and requires a separate transceiver module for each band. As will become apparent from the discussion below, incorporating carrier aggregation into the wireless communication device 200 allows for significant breadth of design options. Therefore, for purposes of this discussion, the wireless communication device 200 also includes a transceiver module 220. The transceiver module 220 includes a first communication chain 220a connected to an antenna 222, and includes a second communication chain 220b connected to antenna 224. Those skilled in the relevant art(s) will recognize that many of the advantages discussed below may be achievable with only a signal transceiver module, or may be achievable using more than two transceiver modules.

The antenna 212 receives a wireless signal from the wireless communication environment 100 and supplies the received wireless signal to the first communication chain 210a of the transceiver module 210. Similarly, the antenna 214 receives a second wireless signal from the wireless communication environment 100 and supplies the received second wireless signal to the second communication chain 210b of the transceiver module 210. The second wireless signal may be the same as, or different from, the signal received by the antenna 212. The communication chains 210a and 210b are each capable of performing independent front-end processings on their respective received signals. After performing their respective processings, the communication chains 210a and 210b forward the received signals to the controller module 230 for further processing.

The transceiver module 220 operates substantially the same as the transceiver module 210, and may operate within a different frequency band of wireless signals. Each of the antennas 222 and 224 receive wireless signals from the wireless communication environment 100 that are within the specified frequency band. The antennas 222 and 224 provide these signals to their corresponding communication chains 220a and 220b for front-end processing. The communication chain 220a and the communication chain 220b are each capable of performing independent front-end processings on their respective signals. After processing the received signals, the transceiver module 220 forwards the signals to the controller module 230 for further processing.

As discussed above, FIG. 2A shows each of the communication chains 210a, 210b, 220a and 220b having their own corresponding antennas 212, 214, 222, and 224, respectively. However, the wireless communication device 200 may instead provide a single antenna to be shared among communication chains that operate on different frequencies, as shown in FIG. 2B.

Figure 2B:
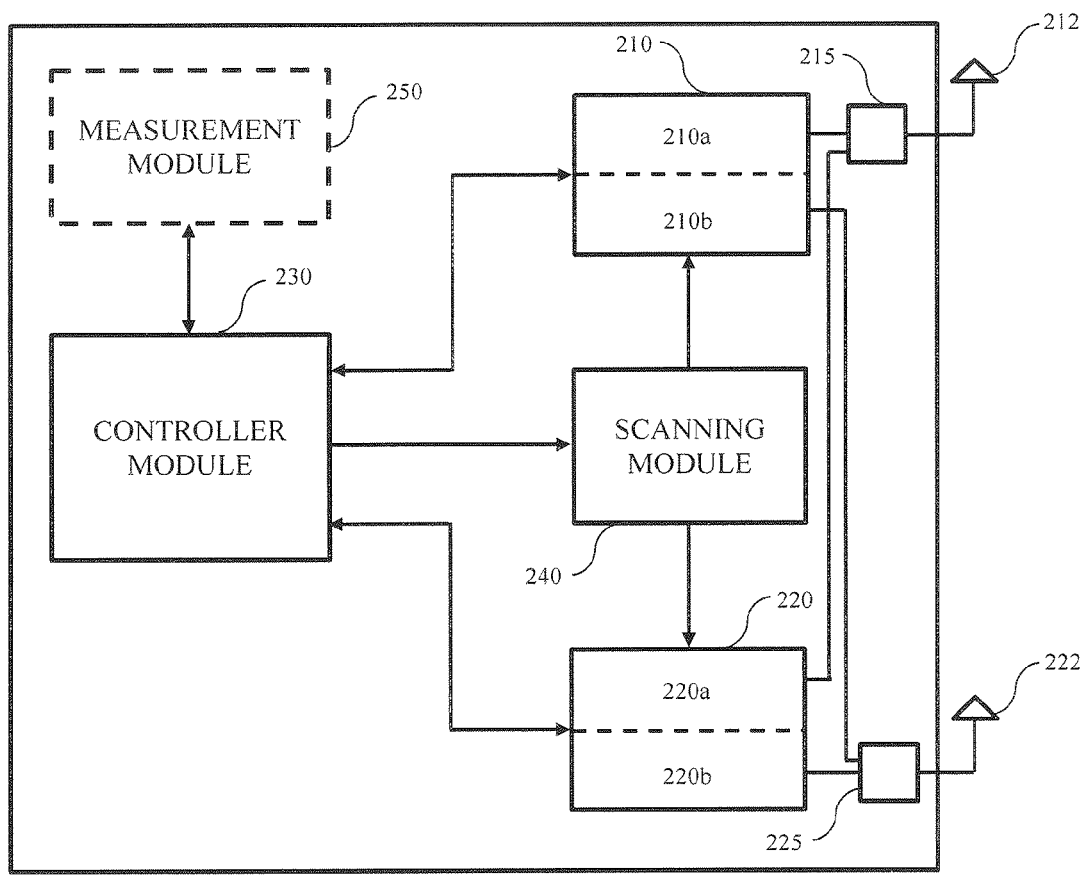
FIG. 2B illustrates a block diagram of an exemplary wireless communication device that may be implemented as part of the pair of wireless communication devices.

FIG. 2B illustrates a block diagram of an exemplary wireless communication device 200 that is implemented within the wireless communication environment 100. As shown in FIG. 2B, the communication chains 210a and 220a share a single antenna 212 via a duplexer 215, and communication chains 210b and 220b share a single antenna 222 via duplexer 225. In an embodiment, the duplexers 215 and 225 are replaced with or include at least one of a power divider, a hybrid combiner, and a filter, or a similar digital process. This antenna sharing can be performed using any acceptable method, including duplexing for example. However, sharing an antenna among multiple communication chains incurs RF losses over having individual antennas for each communication chain. For purposes of this discussion, it will be assumed that each communication chain has its own corresponding antenna, as shown in FIG. 2A.

Referring back to FIG. 2A, the controller module 230 can perform several functions within the wireless communication device 200. For example, the controller module 230 may be capable of performing any or all of various device management functions, processing data contained within the signals received by the transceiver modules 210 and 220, generating instruction signals for controlling other modules of the wireless communication device, and generating output signals for transmission by the transceiver modules 210 and 220 into the wireless communication environment 100, as well as other functions that will become apparent.

The wireless communication device 200 also includes a scanning module 240. The scanning module 240 is capable of controlling one or more of the transceiver modules 210 to perform a scanning operation using one or more of their respective communication chains. The controller module 230 may monitor a time duration and/or channel/signal conditions to determine whether to perform a scanning operation. After determining that a scanning operation is desired, the controller module 230 may generate and issue a scanning instruction containing various scanning parameters to the scanning module 240. Upon receipt of the scanning instruction, the scanning module 240 controls the transceiver module 210 and/or the transceiver module 220 to perform scanning operations based on the received scanning instruction. The scanning module 240 may control the selected transceiver module to scan using any number of its communication chains. Further details regarding possible scanning operations, and their respective benefits, are discussed in detail below.

The wireless communication device 200 may also optionally include a measurement module 250 for evaluating available base stations and/or for performing various measurements on received signals. The implementations in which the measurement module 250 is included in the wireless communication device 200, as well as its functions, will be discussed in detail below.

1. First Exemplary Scanning Operations

In a first exemplary scanning operation, the controller module 230 generates a measurement gap request signal (i.e., a communication gap from the base station, during which the wireless communication device can scan other base stations) and forwards the measurement gap request signal to the transceiver modules 210 and 220. The transceiver modules 210 and 220 transmit the measurement gap request signal to the current base station via the communication environment 100. In response, the wireless communication device 200 receives a response signal from the current base station identifying a measurement gap. Those skilled in the relevant art(s) will recognize that many communication standards permit base stations to initiate measurement gaps, therefore eliminating the need for the wireless communication device to transmit a measurement gap request signal.

After processing the received response signal, the controller module 230 issues an instruction signal to the scanning module 240 to scan for available base stations. The scanning module 240 then controls both the transceiver module 210 and the transceiver module 220 to scan for available base stations using all of their respective communication chains and antennas in parallel. The communication chains can also be controlled to scan on different frequencies from one another.

By controlling both the transceiver module 210 and the transceiver module 220 to scan for available base stations, the wireless communication device 200 is able to perform substantially more scans as a conventional wireless communication device that does not include multiple transceiver modules, or that only use one of its transceiver modules to scan. In particular, the ability to scan in parallel requires that the communication chains are able to be tuned to different frequencies at the same time. Because most conventional wireless communication devices only include a signal transceiver module, conventional wireless communication devices are incapable of achieving this efficiency. As an additional advantage, by having more scans, the wireless communication device 200 can better estimate the links to the available base station and can make better handoff decisions.

In addition, conventional wireless communication devices are already required to request a measurement gap from a current base station in order to scan for available base stations. Thus, the above scanning operation constitutes an inexpensive and easy-to-implement modification of the current protocol.

2. Second Exemplary Scanning Operation

In a second exemplary scanning method, the wireless communication device 200 does not request a measurement gap from the current base station. Instead, the controller module 230 generates a scanning instruction signal instructing the scanning module 240 to scan using fewer than all of the transceiver modules. Thus, for example, the scanning module 240 controls the transceiver module 220 to scan for available base stations. Meanwhile, the transceiver module 210 continues to send and receive wireless communication signals with the current base station.

By implementing this operation, the wireless communication device 200 is able to scan for available base stations while simultaneously communicating with the current base station. Consequently, this scanning operation saves significant bandwidth over conventional scanning operations. In particular, because the wireless communication device 200 maintains its connection with the current base station even during the scanning operation, it is not necessary for the wireless communication device to consume bandwidth requesting and receiving a measurement gap, or by breaking communication with the current base station during the measurement gap.

In addition, in order to improve the performance of this scanning operation, the wireless communication device 200 can include the measurement module 250 to measure the signal strength of signals received from the current base station. In particular, prior to initiating the scanning operation, the controller module 230 can control the measurement module 250 to measure signal strengths of the signals received from the current base station by each of the transceiver module 210 and the transceiver module 220. After determining the signal strengths of the wireless communication signals received by the transceiver modules, the measurement module 250 provides the result to the controller module 230. The controller module 230 determines which of the transceiver modules is receiving signals with better characteristics from the current base station and generates a scanning instruction instructing the scanning module 240 to scan using the transceiver module(s) that is receiving the signals with worse characteristics from the current base station.

For example, if results of the signal strength analysis by the measurement module 250 show that the transceiver module 210 is receiving stronger signals from the current base station, the controller module generates a scanning instruction that instructs the scanning module 240 to scan for available base stations using transceiver module 220. This allows for the wireless communication device 200 to maintain its strongest connection with the current base station during scanning. In addition, any unused transceiver oscillator can be used for receiving signals 3. Third Exemplary Scanning Operation In a third exemplary scanning operation, the controller module 230 of the wireless communication device 200 instructs the scanning module 240 to scan for available base stations during periods of inactivity, such as during periods of time-frequency space within data sub-frames of received or transmitted signals that need not be processed, as discussed below.

FIG. 3A illustrates an exemplary data frame 300. The data frame 300 includes a plurality of sub-frames 310 (SF0-SF9). FIG. 3A shows a magnified view of an exemplary sub-frame SF4 of the data frame 300, which is indicative of each of the sub-frames 310. The sub-frame 310 includes a matrix of resource elements, such as resource element 314, that span time along the horizontal axis and frequency along the vertical axis. Each of the resource elements contains a time-frequency allocation capable of containing data.

Each column of resource elements within the sub-frame 310 is a data symbol, such as data symbol 312. Within the sub-frame 310, a plurality of left-most data symbols comprise a control channel portion 320, and the remaining data symbols comprise a payload portion 330 of the sub-frame 310. The control channel portion 320 typically includes the first 1-4 symbols of the sub-frame. The control channel portion 320 contains various protocol instructions, including for example data allocation, enablement/disablement of discontinuous reception (DRX mode), and enablement/disablement of Semi-Persistent Scheduling (SPS mode). The payload portion 330 of the sub-frame 310 contains data. In an embodiment, the control channel portion 320 does not include the protocol instructions, but rather the locations of the protocol instructions contained in the payload portion 330.

FIG. 3B illustrates an exemplary sub-frame 310 that has been provided with a data allocation 316. In particular, the control channel portion 320 of the sub-frame 310 has identified an allocation 316 of resource elements 314. The allocation 316 includes blocks of resource elements 314 that either contain data from the base station, or in which the wireless communication device 200 may load data for transmission to the base station.

The wireless communication device 200 decodes a channel control portion 320 of a received sub-frame 310. By decoding the channel control portion, the wireless communication device 200 can determine whether an allocation 316 has been provided within the current sub-frame 310. If there is no allocation (as shown in FIG. 3A), or if the allocation does not utilize at least a portion of each data symbol/column (as shown in FIG. 3B), the controller module 230 of the wireless communication device 200 can instruct the scanning module 240 to scan during the unallocated time slots (data symbols/columns) of the sub-frame 310. In other words, because the control channel portion 320 has indicated that there are unused time slots in the sub-frame 310, the device can utilize these unallocated time slots to perform scanning operations. Further, as long as the wireless communication device 200 stops the scanning operation in time to receive the next sub-frame, the wireless communication device can perform the scanning operation without breaking a connection with the current base station.

Generally, the wireless communication device 200 will decode the control channel portion 320 of every sub-frame it receives. However, certain circumstances allow for the wireless communication device to forgo scanning many of the control channel portions, and instead perform scanning operations during those periods. For example, as discussed above, a control channel portion 320 may include or point to instructions that cause the wireless communication device 200 to enter DRX mode or other inactivity mode (collectively referred to herein as "DRX mode"). DRX mode is a power-saving mode in which the base station informs the wireless communication device that there will be a temporary halt in data transfer. This allows the wireless communication device to enter a low-power state for the duration of the data transfer halt.

When the wireless communication device 200 decodes a control channel portion 320 that instructs the wireless communication device 200 to enter DRX mode, the controller module 230 may generate and forward a scanning instruction signal to the scanning module 240. Rather than enter a low-power state, the scanning module 240 may control the transceiver modules 210 and 220 to perform scanning operations.

With this scanning operation, the wireless communication device 200 is able to utilize substantial periods of inactivity for scanning for available base stations. By performing the scanning operations during otherwise idle periods, the wireless communication device 200 is able to make use of time that otherwise would have been wasted without breaking its connection to the current base station (i.e., without a measurement gap).

As an alternative to, or in addition to, instructing the wireless communication device to enter DRX mode, the control channel portion 320 of the sub-frame 310 may instruct the wireless communication device 200 to enter SPS mode. In SPS mode, a wireless communication device is provided with a periodicity with which to expect data-allocated sub-frames. In other words, the SPS notification contained within the control channel portion 320 identifies how often the wireless communication device must decode a sub-frame.

When the wireless communication device 200 decodes a channel control portion 320 that instructs the wireless communication device 200 to enter SPS mode, the controller module 230 may generate and forward a scanning instruction to the scanning module 240. The scanning module 240 may then control the transceiver modules 210 and 220 to perform scanning operations during the sub-frames for which decoding is unnecessary. Further, even when it is time for the wireless communication device 200 to decode a data-allocated sub-frame 310 (FIG. 3B), it is often not necessary to decode the channel control portion 320 because the SPS mode has already identified when the next data-allocated sub-frame 310 will arrive. Consequently, the scanning module 240 can control the transceiver modules 210 and 220 to scan for available base stations during the control channel portion 320 of the data-allocated sub-frame 310.

As an example, during an LTE voice call, the data rate is particularly low (e.g., 30 kbps), which leaves a large amount of time (20 ms) between allocations to the wireless communication device 200. As discussed above, the wireless communication device may optionally decode each control channel portion 320 of received sub-frames 310 to determine which sub-frame 310 includes a data allocation 316. The wireless communication device 200 may then perform scanning operations during the sub-frames 310 that do not include a data allocation 316. Alternatively, the base station could instead instruct the wireless communication device 200 to enter DRX mode. The wireless communication device 200 could then perform scanning operations during the duration of the DRX idle time. As a further option, if the base station instructs the wireless communication to enter SPS mode, the wireless communication device 200 could scan during the period of inactivity between data-allocated sub-frames 310, and could scan during the control channel portions 320 of the data-allocated sub-frames 310.

These scanning operations allow for the wireless communication device 200 to improve scanning potential and effectively use idle time.

4. A Fourth Exemplary Scanning Operation

The wireless communication device 200 includes a plurality of antennas 212, 214, 222 and 224 connected to a plurality of communication chains 210a, 210b, 220a and 220b, respectively. However, in certain circumstances, it may be unnecessary to use each of the communication chains and antennas to decode signals from the wireless communication environment. In these circumstances, the scanning module 240 can control those communication chains/antennas that are not needed for decoding received signals to perform scanning operations.

A. Scan During Control Channel Portion

As a first scenario, the control channel portion 320 is typically transmitted at a very low data rate in order to ensure successful transmission. Therefore, only a single communication chain/antenna may be necessary to decode the control channel portion 320. Consequently, the controller module 230 can generate and forward a scanning instruction to the scanning module 240 that causes the scanning module 240 to control each of the remaining communication chains/antennas to perform scanning operations during the time of receiving the control channel portion 320.

B. Scan During Payload Portion in Transmit Diversity

As a second scenario, the payload portion 330 of a sub-frame 310 is often transmitted from the current base station using "transmit diversity," which intends that the payload portion 330 is received by both communication chains/antennas of a single transceiver module.

A signal transmitted using transmit diversity within the first frequency band is intended to be received by the antenna 212 and its corresponding communication chain 210a, as well as the antenna 214 and its corresponding communication chain 210b. Upon receipt of such transmit diversity signals, the measurement module 250 measures the Signal-to-Noise Ratio (SNR) of the received signals. Provided that the measured SNR exceeds a threshold, the controller module 230 can generate and forward a scanning instruction to the scanning module 240. The scanning module can then control the communication chain 210b and its corresponding antenna 214 (as well as the communication chains 220a and 220b and antenna 222 and 224) to perform scanning operations, while allowing only the communication chain 210a and its corresponding antenna 212 to receive signals from the current base station. This scenario provides an added benefit of reducing power consumption.

C. Scan During Punctured Payload Portion

As a third scenario, the wireless communication device 200 may be able to artificially puncture received signals (i.e., ignore or remove resource elements from the received signals) in order to perform scanning operations. In particular, the scanning module 240 could control one or more of the communication chains/antennas to perform scanning operations during a modest number of symbols 312 within the sub-frame 310.

This is most often useful during the evaluation stage of a scanning operation. In particular, evaluating base stations typically requires significantly less time than searching for base stations, and is small enough so as to minimally puncture received signals.

Although the puncturing will generally result in an increased error rate and decreased throughput, the errors created by the puncturing can be corrected by Hybrid Automatic Repeat Request (HARQ) that is typically included as part of a signal transmission. In addition, the overall throughput may actually be improved by avoiding interruptions to data reception associated with scanning. This scanning operation can further be optimized by selecting specific sub-frames and/or symbols to puncture based on link budget, the MCS (modulation and coding scheme) of the transmission, and/or the strength of a previous transmission.

D. Scan while Receiving Space-Time or Space-Frequency Code in Presence of Strong Channel Imbalance As a fourth scenario, the wireless communication device 200 can perform a scanning operation during receipt of a space-time or space-frequency code.

Space-time and space-frequency coding are techniques used in wireless communications to transmit multiple versions of a data stream across a number of antennas, and to exploit the various received versions of the data to improve reliability of data-transfer. However, channel conditions within the wireless communication environment 100 may have profound effects on one of the versions, while having minimal effects on others of the versions. In the presence of a strong channel imbalance, one or more of the versions received by the wireless communication device 200 may be particularly weak. Although space-time and space-frequency codes derive their benefits from receiving and processing all of the versions of the data stream, little is gained by receiving and processing the weak versions.

Consequently, in this scenario, the measurement module 250 measures the signal strengths of the versions received by the wireless communication device 200 and reports the results to the controller module 230. The controller module 230 determines which of the signal versions are the weakest (which of the versions are below a threshold value) and generates and forwards a scanning instructing to the scanning modules based on its determination. The scanning module 240 then controls the antennas and communication chains associated with receiving the weakest versions to instead perform scanning operations.

As an example, the controller module 230 may determine that the signal strengths of versions received by antenna 212 and antenna 222, as measured by the measurement module 250, fall below the threshold value. Therefore, the controller module 230 generates and forwards a scanning instruction to the scanning module 240. Based on the scanning instruction, the scanning module 240 controls the communication chain 210a and its antenna 212, as well as communication chain 220a and its antenna 222, to perform scanning operations. The signal versions will continue to be received by the communication chain 210b and its antenna 214, as well as communication chain 220b and its antenna 224.

5. Scanning Optimization and Improvement

For many of the various scanning operations discussed above, additional modifications can be made. Each of the modifications discussed below may be, alone or together with others of the modifications, applicable to multiple ones of the scanning operations detailed above.

A. Prioritizing Available Base Stations

When performing its scanning operations, the wireless communication device 300 may discover that it is within communication range of many available base stations. The signal strengths associated with each of the available base stations will relatively correspond to the likelihood that the wireless communication device 200 will "handoff" to that station. Thus, the wireless communication device 200 can prioritize scanning operations to the available base stations having the strongest response signals.

For example, after performing a scanning operation, the wireless communication device 200 may receive several response signals from numerous available base stations. The measurement module 250 measures the signal strengths of each of these responses and provides the results to the controller module 230. The signal strengths may be determined by calculating SNR, CINR (carrier-to-noise plus interference ratio), delay, or RSSI (Received Signal Strength Indication), etc.

The controller module 230 analyzes the received signal strength information and creates a priority list that prioritizes the available base stations based on their respective signal strengths. When the controller module 230 desires to prompt a scanning instruction, the controller module 230 will generate scanning instructions for the higher-prioritized available base stations at a higher frequency than the lower-prioritized available base stations. In other words, the controller module 230 will instruct the scanning module 240 to scan available base stations with high signal strengths more often than it will instruct the scanning module 240 to scan available base stations with low signal strengths.

In this manner, the wireless communication device 200 is able to acquire more information about available base stations to which the wireless communication device 200 is likely to handoff, and spend fewer resources scanning candidates to which the wireless communication device 200 is unlikely to handoff.

B. Adjusting Scanning interval Based on Channel Conditions

In order to maximize useful resources, and minimize power consumption, the controller module 230 of the wireless communication device 200 may adjust scanning intervals based on changes in channel conditions.

When receiving signals from the wireless communication environment 100, the measurement module 250 evaluates channel conditions of the wireless communication environment 100, including Doppler spread or time rate of change of lognormal shadowing to provide some examples. After measuring the channel conditions, the measurement module 250 forwards the results to the controller module 230.

The controller module 230 compares the current measured channel conditions to previous measured channel conditions. If the controller module 230 determines that a change in channel conditions is below a predetermined threshold, then the controller module 230 can initiate scanning instructions at a reduced rate (i.e., increase time intervals between scanning operations). Alternatively, if the controller module 230 determines that the change in channel conditions exceeds a predetermined threshold, the controller module 230 can initiate scanning instructions at an increased rate (i.e., reduce time intervals between scanning operations).

C. Prioritizing Antennas Used for Scanning Operations

As discussed above, the wireless communication device 200 includes multiple antennas that are each capable of receiving signals from available base stations. In order to capture spatial diversity during scanning operations, each of the antennas is preferably used. In this case, a round robin technique could be used to multiplex the signals received by the antennas.

However, as an alternative, the antenna(s) that receives the strongest signals could be prioritized. For example, the controller module 230 could instruct the scanning module 240 to scan for an available base station using each of the antennas 212, 214, 222 and 224. The measurement module 250 measures the signal strengths of the response signals received by each of the antennas and forwards the results to the controller module 230. The signal strengths could be determined based on CINR, delay, or delay spread between the corresponding antenna and the available base station, etc.

The controller module 230 analyzes the measured signal strengths to determine which of the antennas receives the strongest signal. Based on the result of the analysis, the controller module 230 prioritizes that antenna during future scans. In other words, the antenna receiving the strongest signals from the available base station is controlled to perform future scanning operations more frequently than the antennas receiving weaker signals.

By repeatedly performing this analysis and prioritization, the wireless communication device 200 is able to effectively track the available base station using the best antenna.

Those skilled in the relevant art(s) will recognize that many of the above-described scanning operations can be slightly modified and/or combined with others of the above-described scanning operations. For example, the wireless communication device may perform scanning operations during periods of inactivity and also during punctured payload portions of received signals. Many other combinations and modifications may be available depending on application within the spirit and scope of the present disclosure.

A First Exemplary Method of Scanning for a Available Base Station

FIG. 4 illustrates a block diagram of an exemplary method for scanning for an available base station in a wireless communication device.

The wireless communication device transmits a measurement gap request signal to a current base station (420). In response, the wireless communication device receives a measurement gap response signal from the current base station that identifies a measurement gap to the wireless communication device (430). During the measurement gap, the wireless communication device scans (frequencies and/or technologies) for available base stations using some or all of its communication chains and antennas (440).

A Second Exemplary Method of Scanning for a Available Base Station

FIG. 5 illustrates a block diagram of a method for scanning for an available base station in a wireless communication device.

The wireless communication device scans for available base stations using fewer than all of its transceiver modules (520). At the same time, the wireless communication device allows for some or all of the remaining transceiver modules (the transceiver modules not being used for scanning) to continue to communicate with the current base station (530).

A Third Exemplary Method of Scanning for a Available Base Station

FIG. 6 illustrates a block diagram of an exemplary method for scanning for an available base station in a wireless communication device.

The wireless communication device receives a signal from the current base station having a plurality of sub-frames (620). Each of the sub-frames includes a control channel portion. The wireless communication device decodes a control channel portion of one of the sub-frames (630).

From the decoded control channel portion, the wireless communication device determines future periods of inactivity (640). For example, the periods of inactivity may be unallocated sub-frames of the received signal or durations of time due to DRX or SPS instructions contained within the control channel portion. The wireless communication device then performs scanning operations during the identified periods of inactivity (650).

A Fourth Exemplary Method of Scanning for a Available Base Station

FIG. 7 illustrates a block diagram of an exemplary method for scanning for an available base station in a wireless communication device.

The wireless communication device receives a signal from the current base station (720). The wireless communication device then determines modulation/signal characteristics based on the received signal (730). For example, the wireless communication device may determine the coding rate of the control channel portion, whether the signal has been transmitted using transmit diversity, whether the signal includes time-frequency sub-frames, and/or whether the signal is transmitted as one of multiple versions within a space-time/space-frequency code.

The wireless communication device then performs scanning operations depending on the determined modulation/signal characteristics. For example, if the wireless communication device determines that the coding rate of the control channel portion is sufficiently low, the wireless communication device decodes the control channel portion using only a single antenna/communication chain, and scans for available base stations using the remaining antennas/communication chains. If the wireless communication device determines that the signal has been transmitted using transmit diversity, the wireless communication device measures a SNR of the received signal. If the SNR exceeds a threshold value, the wireless communication device decodes the received signal using only a single antenna/communication chain and scans for available base stations using the remaining antennas/communication chains.

If the wireless communication device determines that the signal includes time-frequency sub-frames, the wireless communication device may intentionally puncture various portions of the sub-frame and perform scanning operations during the punctured periods. The wireless communication device can then regain the lost information using HARQ and/or other correction methods. If the wireless communication device determines that the signal is transmitted as one of multiple versions within a space-time/space-frequency code, the wireless communication device measures the signal strengths of the multiple versions. For versions that fall below a signal strength threshold, the wireless communication device scans for available base stations using the antennas/communication chains that received those "weak" versions.

Those skilled in the relevant art(s) will recognize that each of the above methods can additionally or alternatively include any of the functionality of the wireless communication device 200 discussed above, as well as any of the modifications discussed above. Further, the above description of the exemplary method should neither be construed to limit the method nor the description of the wireless communication device 200.

CONCLUSION

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A wireless communication device, comprising:
a plurality of transceiver modules configured to communicate with a current base station wherein at least one of the transceiver modules receives a signal from the current base station that includes a data sub-frame having a control channel portion and a payload portion, and wherein the control channel portion indicates to the wireless communication device that the payload portion includes at least one unallocated data symbol that has not been allocated to the wireless communication device; and
a scanning module configured to:
select one of the plurality of transceiver modules as a scanning transceiver module;
control the scanning transceiver module to scan for an available base station on different respective frequencies; and
control the scanning transceiver module to scan for the available base station during times corresponding to the at least one unallocated data symbol of the payload portion based on the indication of the control channel portion.

2. The wireless communication device of claim 1, wherein during a measurement gap, the scanning module controls the scanning transceiver module and a second scanning transceiver module to scan for the available base station using the different respective frequencies.

3. A wireless communication device, comprising:
a plurality of transceiver modules configured to communicate with a current base station;
a measurement module configured to measure a signal characteristic of signals received from the current base station by each of the plurality of transceiver modules;
a controller module configured to:
compare the measured signal characteristic of each of the plurality of transceiver modules to a predetermined threshold, and
identify a scanning transceiver module from among the plurality of transceiver modules whose measured signal characteristic value is below the predetermined threshold and a communication transceiver module from among the plurality of transceiver modules whose measured signal characteristic value exceeds the predetermined threshold; and
a scanning module configured to control the scanning transceiver module to scan for an available base station and to control the communication transceiver module to simultaneously communicate with the current base station.

4. The wireless communication device of claim 3, wherein the scanning module controls multiple transceiver modules that are not scanning to communicate with the current base station.

5. The wireless communication device of claim 3, wherein at least one of the transceiver modules receives a signal from the current base station,
wherein the signal includes a data sub-frame having a plurality of resource elements that each have a frequency and time allocation, and
wherein the data sub-frame includes a control channel portion and a payload portion.

6. The wireless communication device of claim 5, wherein the scanning module controls fewer than all of the plurality of transceiver modules to decode the control channel portion of the data sub-frame, and controls at least one of a remainder of the transceiver modules to scan for the available base station.

7. The wireless communication device of claim 5, wherein, when the measured signal characteristic of the signal exceeds the predetermined threshold, the scanning module controls fewer than all of the plurality of transceiver modules to decode the payload portion of the signal, and controls at least one of a remainder of the transceiver modules to scan for the available base station.

8. The wireless communication device of claim 5, wherein the scanning module controls a transceiver module of the plurality of transceiver modules to disregard a resource element of the signal, and to instead scan for the available base station during the time allocation associated with the resource element.

9. A wireless communication device, comprising:
a plurality of transceiver modules configured to communicate with a current base station, wherein at least one of the transceiver modules receives a signal from the current base station that includes a data sub-frame having a control channel portion and a payload portion, and wherein the control channel portion indicates to the wireless communication device that it is not necessary to monitor control channel portions of future data sub-frames, and
a scanning module configured to select a transceiver module as a scanning transceiver module and to control the scanning transceiver module to scan for an available base station, wherein the scanning module controls the scanning transceiver module to scan for the available base station during the time that otherwise would have been allocated to decoding control channel portions of the future data sub-frames while maintaining connection with the current base station,
wherein each of the future data sub-frames include a corresponding data allocation to be used by the wireless communication device.

10. The wireless communication device of claim 5, wherein the control channel portion indicates to the wireless communication device that less than all data symbols of the payload portion have been allocated to the wireless communication device, and
wherein the scanning module controls the scanning transceiver module to scan for the available base station during the time corresponding to the unallocated data symbols.

11. The wireless communication device of claim 5, wherein the wireless communication device operates in Discontinuous Reception (DRX) mode, and
wherein the scanning module controls the scanning transceiver module to scan for the available base station during DRX periods of inactivity.

12. The wireless communication device of claim 5, wherein the control channel portion indicates to the wireless communication device that a portion of the payload portion has been allocated to the wireless communication device for a current sub-frame and for periodic future sub-frames as part of semi-persistent scheduling, and
wherein the scanning module controls at least one of the scanning transceiver module to scan for the available base station during the control channel portion of the periodic future sub-frames.

13. The wireless communication device of claim 3, wherein the scanning module causes transceiver modules with stronger signal characteristics to scan for the available base station more frequently than transceiver modules having weaker signal characteristics.

14. The wireless communication device of claim 2, further comprising:
a multiplexer,
wherein the scanning module controls the scanning transceiver module to scan for the available base station one at a time in a round robin configuration, and
wherein the multiplexer combines data received by the scanning transceiver module.

15. The wireless communication device of claim 2, wherein the scanning module is configured to identify frequencies to be scanned, and
wherein the scanning module selects more than one scanning transceiver module that corresponds to the identified frequencies for performing the scan for the available base station.

16. The wireless communications device of claim 3, wherein the measured signal characteristic is signal strength.

17. The wireless communication device of claim 3, wherein the comparing includes ranking the plurality of transceiver modules according to their respective measured signal characteristics, and
wherein the controller module is configured to identify as the scanning transceiver module the one of the plurality of transceiver modules that has the lowest ranking.

* * * * *